(12) United States Patent
Hallale et al.

(10) Patent No.: US 11,419,273 B2
(45) Date of Patent: *Aug. 23, 2022

(54) NEEDLE FRAME ASSEMBLY AND NEEDLE COUPLING FOR AGRICULTURAL MACHINE

(71) Applicant: Deere & Company, Moline, IL (US)

(72) Inventors: Sanjeev M. Hallale, Pune (IN); Mohamad S. El-Zein, Bettendorf, IA (US); Nathan F. Tortorella, Bettendorf, IA (US); Amol M. Sawale, Pune (IN); Hector Portillo, Monterrey (MX); Darin L. Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 641 days.

This patent is subject to a terminal disclaimer.

(21) Appl. No.: 16/459,036

(22) Filed: Jul. 1, 2019

(65) Prior Publication Data

US 2021/0000017 A1 Jan. 7, 2021

(51) Int. Cl.
*A01F 15/12* (2006.01)
*B65B 13/04* (2006.01)
(Continued)

(52) U.S. Cl.
CPC .............. *A01F 15/12* (2013.01); *A01D 59/06* (2013.01); *A01F 15/071* (2013.01); *A01F 15/08* (2013.01);
(Continued)

(58) Field of Classification Search
CPC ........ A01F 15/071; A01F 15/08; A01F 15/04; A01F 15/12; A01F 2015/073; A01F 2015/143; A01F 15/14; A01D 59/06; B65B 13/04; F16B 2/065; F16B 7/04; F16B 7/00; F16B 7/048
(Continued)

(56) References Cited

U.S. PATENT DOCUMENTS 3,027,825 A 4/1962 Nolt et al.
3,036,514 A 5/1962 Mcduffie
(Continued)

FOREIGN PATENT DOCUMENTS

DE 20203060 U1 7/2003
EP 2198687 A1 6/2010
(Continued)

OTHER PUBLICATIONS

Images of Claas Quadrant LSB needle carriage tube, publicly available at least as early as 2018 (1 page).
(Continued)

*Primary Examiner* — Jimmy T Nguyen
(74) *Attorney, Agent, or Firm* — Michael Best & Friedrich LLP

(57) ABSTRACT

An agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm.

20 Claims, 15 Drawing Sheets

(51) Int. Cl.
  *A01F 15/07* (2006.01)
  *A01F 15/08* (2006.01)
  *A01F 15/04* (2006.01)
  *A01D 59/06* (2006.01)
  *A01F 15/14* (2006.01)

(52) U.S. Cl.
  CPC .............. *B65B 13/04* (2013.01); *A01F 15/04* (2013.01); *A01F 2015/073* (2013.01); *A01F 2015/143* (2013.01)

(58) Field of Classification Search
  USPC .................................................. 100/19 R, 24
  See application file for complete search history.

(56) References Cited

U.S. PATENT DOCUMENTS

| | | | | |
|---|---|---|---|---|
| 3,211,084 | A * | 10/1965 | Barfield | ................. A01F 15/12 100/24 |
| 3,550,969 | A * | 12/1970 | Robinson | .............. F16B 7/0493 403/392 |
| 4,102,261 | A | 7/1978 | White | |
| 4,310,186 | A | 1/1982 | Vansteelant | |
| 5,156,085 | A | 10/1992 | Bossche | |
| 7,458,620 | B2 * | 12/2008 | Rotole | ................... A01F 15/12 289/16 |
| 9,936,646 | B2 | 4/2018 | Demulder et al. | |
| 2013/0118366 | A1 | 5/2013 | Esau et al. | |
| 2018/0098501 | A1 | 4/2018 | Kraus | |
| 2018/0098506 | A1 | 4/2018 | Kraus | |
| 2018/0116123 | A1 | 5/2018 | Chaney | |
| 2019/0000017 | A1 | 1/2019 | Kreyenhagen | |

FOREIGN PATENT DOCUMENTS

| | | | |
|---|---|---|---|
| EP | 3020268 | A1 | 5/2016 |
| EP | 3315017 | A1 | 5/2018 |
| EP | 3391728 | A1 | 10/2018 |

OTHER PUBLICATIONS

European Search Report issued in counterpart application No. 20182171.7 dated Nov. 23, 2020 (08 pages).
European Search Report issued in counterpart application No. 20182175.8 dated Nov. 23, 2020 (13 pages).

* cited by examiner

NEEDLE FRAME ASSEMBLY AND NEEDLE COUPLING FOR AGRICULTURAL MACHINE

FIELD

The present disclosure relates to agricultural harvesting machines having a binding system for securing binding material around a crop package.

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler.

Large square balers have been used in crop harvesting for many years. Large square balers usually utilize a compression system including a gearbox with a crank arm and connecting rod which is attached to a plunger. During each rotation of the crank arm, the plunger compresses the crop in a baling chamber as the plunger moves towards the rear of the baler. Crop is usually metered from a pre-compression chamber into the baler chamber. Large square balers usually include a knotter system for tying twine around the bale before the bale is ejected from the baler chamber. Needles delivery twine through the baling chamber to the knotter system.

The need for increased productivity is motivation to develop faster, more efficient equipment. Designing machines with relatively low density materials, such as Aluminum, can enable drastic improvements in efficiency. In a large square baler, the binding system accelerates from rest very quickly, followed by braking system at the peak of the stroke. Light weight designs will reduce the power required to operate this system. The drive mechanism and braking system may be simplified and minimized. The baler may be also driven at a faster rate because the binding system can move at a faster rate.

SUMMARY

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm. The yoke has a central section, an upper bar extending from the central section, and a lower bar extending from the central section. The central section has an asymmetrical cross-section through a vertical central axis.

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm. The yoke includes an upper bar having a longitudinal first chamber, a lower bar having a longitudinal second chamber, and a central section positioned between the upper bar and the lower bar and having a longitudinal third chamber separate from the first chamber and the second chamber.

According to some embodiments, an agricultural harvesting machine includes a binding mechanism to secure binding material around a crop package and a delivery device to wrap binding material around a portion of the crop package and provide binding material to the binding mechanism. The delivery device includes a needle connected to a needle frame. The needle frame includes a yoke extending between a first arm and a second arm. The yoke has a substantially D-shaped configuration with a curvilinear front portion facing the needle and a rectilinear rear portion opposite the front portion.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
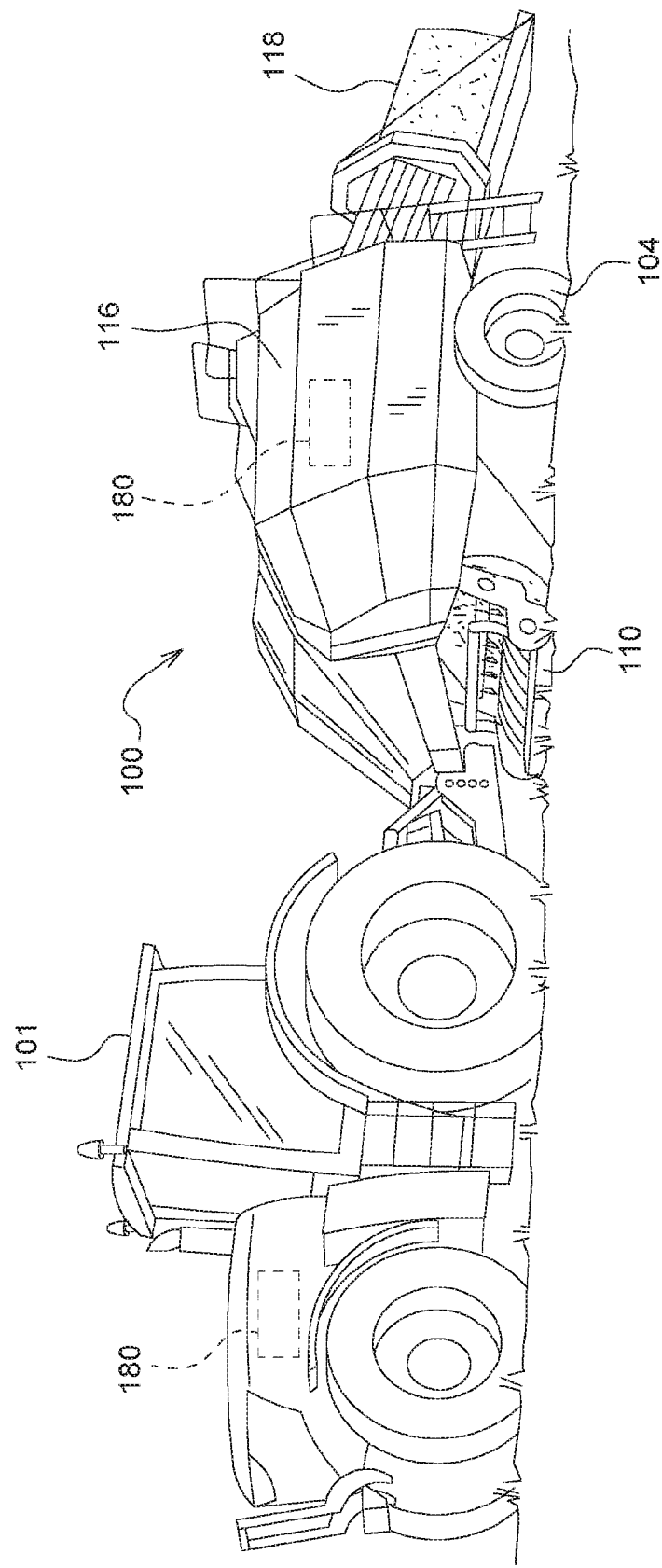
FIG. 1 is a perspective view of an agricultural harvesting machine couple to an agricultural vehicle.

FIG. 1 illustrates an agricultural harvesting machine 100, such as a baler, according to one exemplary embodiment. Although a large square baler is shown, this disclosure also applies to other balers and harvesting machines. An agricultural vehicle 101, such as a tractor, can be coupled to the agricultural harvesting machine 100 or the agricultural harvesting machine 100 can be self-propelled. The agricultural harvesting machine 100 can be combined or integrated with a cotton harvester, a combine, or other harvesting machines.

The agricultural harvesting machine 100 and the agricultural vehicle 101 can each include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

Figure 2:
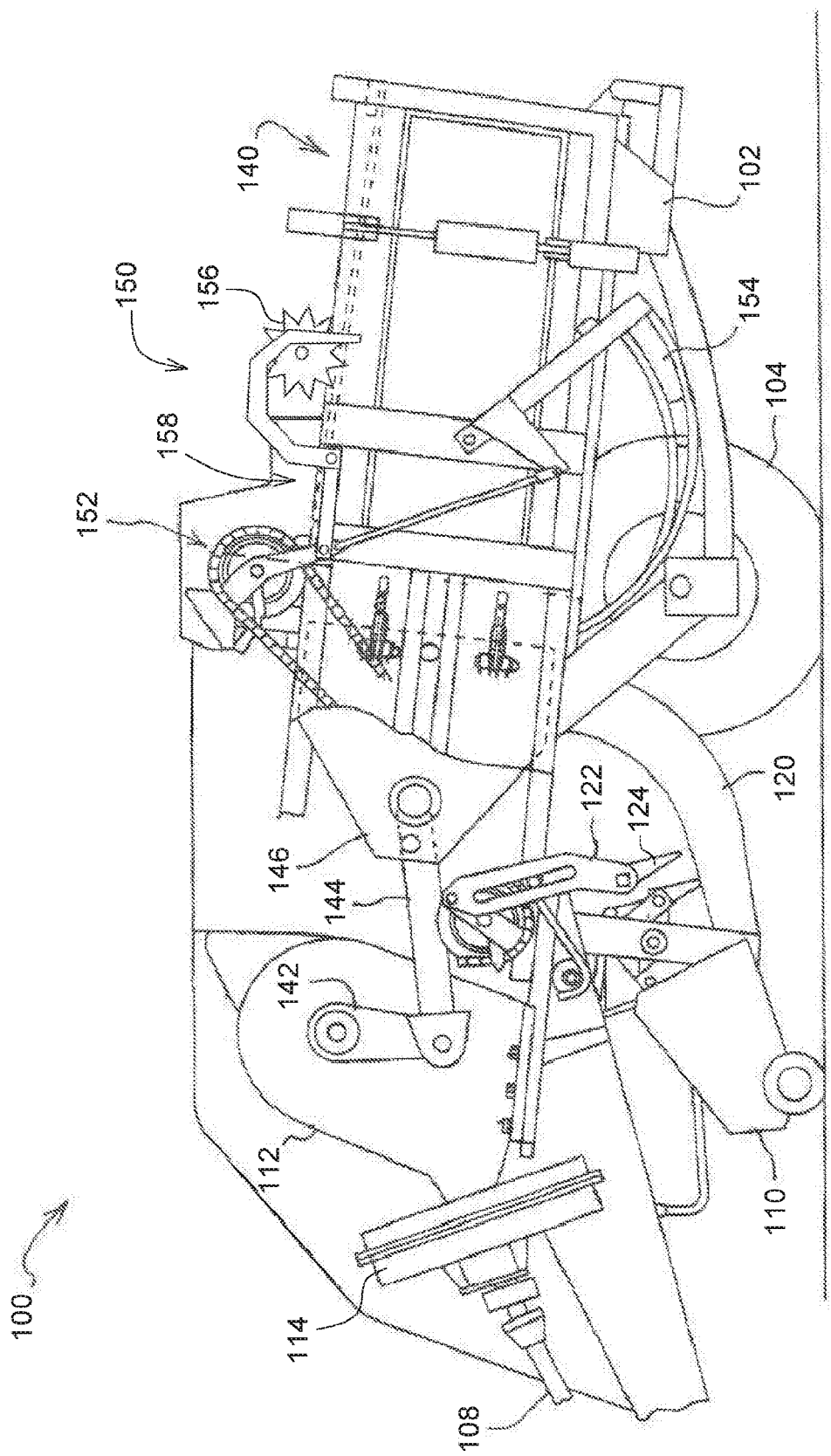
FIG. 2 is a schematic side view of the agricultural harvesting machine of FIG. 1.

As shown in FIG. 2, the baler 100 can include a frame 102, ground engaging devices 104, such as wheels, a hitch for attachment to a tractor or other vehicle, and an input shaft 108, such as a power-take-off (PTO) shaft, which can receive rotational power from a tractor 101, other vehicle agricultural vehicles, or other power sources. The baler 100 can include a pick-up mechanism 110 which gathers crop material from the ground surface and feeds it into the baler 100. The pick-up mechanism 110 can include various pick-up apparatus 111 including, but not limited to, tines, forks, augers, conveyors, baffles, a cutter or pre-cutter assembly, or any combination of the preceding. The baler 100 includes a housing 116, which generally shields various internal components of the baler 100. The input shaft or PTO shaft 108 can connect to an input of the gear train or transmission 112 providing rotational power to the baler 100 from the tractor 101 or other associated vehicle or power source. The transmission 112 can include a gearbox which converts the rotational motion of the input shaft 108 along a generally longitudinal axis of the baler 100 to a rotational motion along a generally transverse axis of the baler 100. A flywheel 114 can connect to the input shaft 108, the transmission 112, or both. The flywheel 114 can be positioned between the transmission 112 and the input shaft 108, as shown.

The baler 100 can include a pre-compression chamber 120 which receives crop material from the pick-up mechanism 110 and accumulates the crop material until a pre-determined fill condition. A loading mechanism 122, or stuffer, moves crop material into the pre-compression chamber 120. The loading mechanism 122 can include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The baler 100 can include a crank arm 142 connected to the rotational output of the transmission 112. A connecting link 144 can be connected between the crank arm 142 and a plunger 146. The connecting link 144 can include one or more members connecting the crank arm 142 to the plunger 146. The crank arm 142 rotates based upon the output of the transmission 112 and the plunger 146 moves in a reciprocal motion as the crank arm 142 rotates. The plunger 146 extends into the compression chamber 140 compressing the crop material and then at least partially retracts from the compression chamber 140 to allow more crop material to enter the compression chamber 140.

With reference to FIGS. 2-6, the baler 100 can include a binding or knotter system 150 which binds the compressed crop material in the compression chamber 140 into a crop package, such as a bundle or bale. The binding system 150 can include one or more binding or knotter mechanisms 152 and one or more corresponding delivery devices or needles 154, which can deliver binding material to the binding mechanisms 152. The binding system 150 wraps and secures a binding material around the compressed crop material, or crop package, during a binding operation. The baler 100 can include a measuring device 156, such as a star wheel, which measures the length of the compressed crop material within the compression chamber 140. The measuring device 156 activates the binding system 150 when the compressed crop material within the compression chamber 140 reaches a desired mass, size, or length. The measuring device 156 can activate the binding mechanisms 152 via a mechanical trip assembly 158.

When the binding system is activated, the one or more binding material needles 154 each move from a lowered position generally below or underneath the baler 100, shown for example in FIG. 4, to a raised position, as shown for example in FIG. 6. The binding material needles 154 pass through a slot 139 in the bottom of the compression chamber 140, a vertically extending slot 149 in the plunger 146, and a slot 141 in the top in of the compression chamber 140. The one or more needles 154 can deliver binding material, such as string or twine, to the binding assembly 152, which secures the binding material around the compressed crop material within the compression chamber 140.

Figure 3:
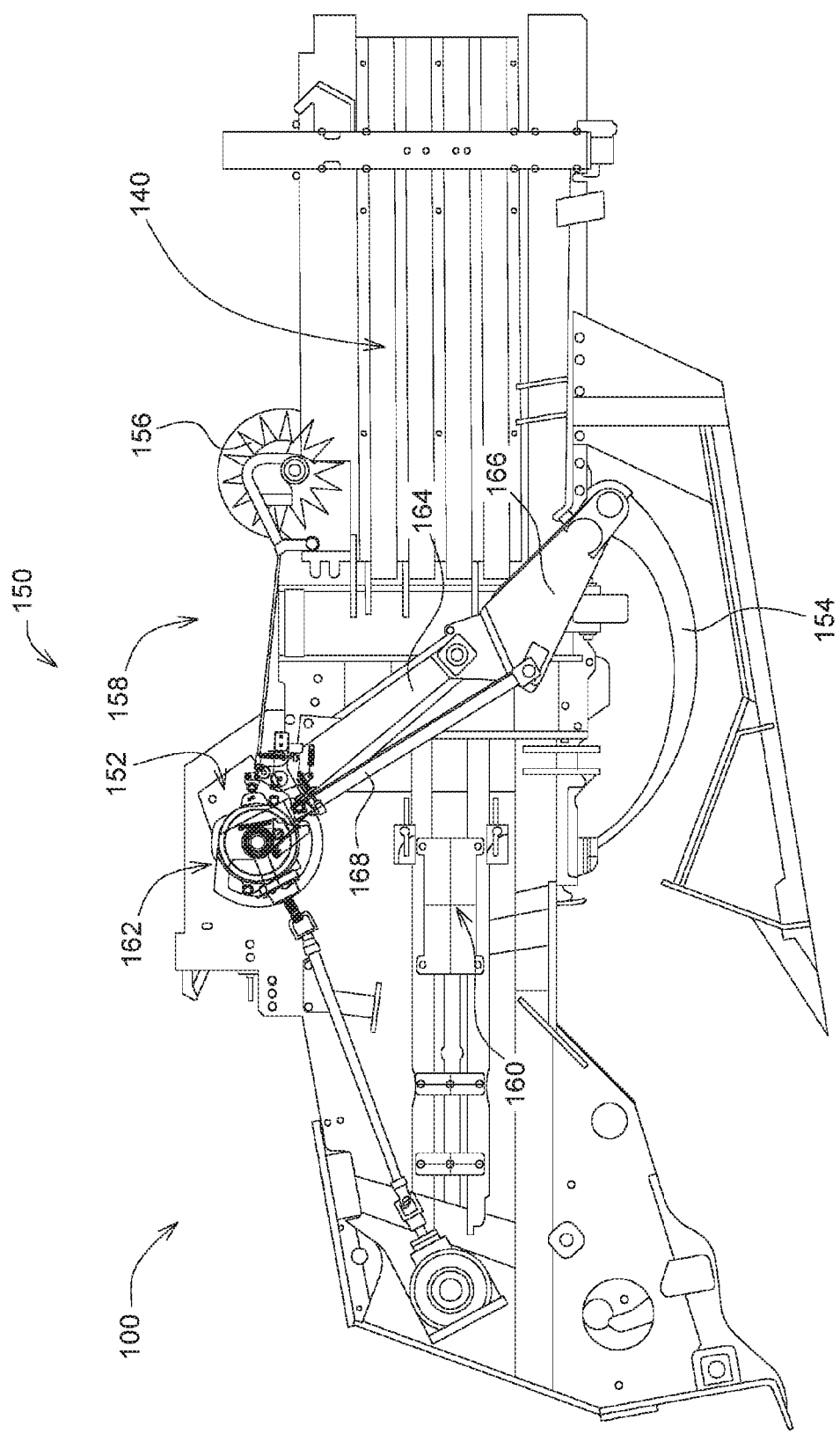
FIG. 3 is a side view of a portion of the agricultural harvesting machine of FIG. 1.

The binding system 150 can include a delivery mechanism 160 for moving the needles 154 from the lowered position to the raised position, as shown for example in FIG. 3. The delivery mechanism 160 can include a pivoting lift arm 162 and a support member 164 which pivotally supports a delivery or needle frame 166. One or more needles 154 can be coupled to the needle frame 166. The needle frame 166 is coupled to the lift arm 162 by a lift link 168. When the pivoting lift arm 162 rotates, the lift link assembly 172 raises the needle frame 166 and the coupled needles 154 from the lowered position, as shown in FIG. 4, through an intermediate position, as shown in FIG. 5, to the raised position, as shown in FIG. 6.

Figure 4:
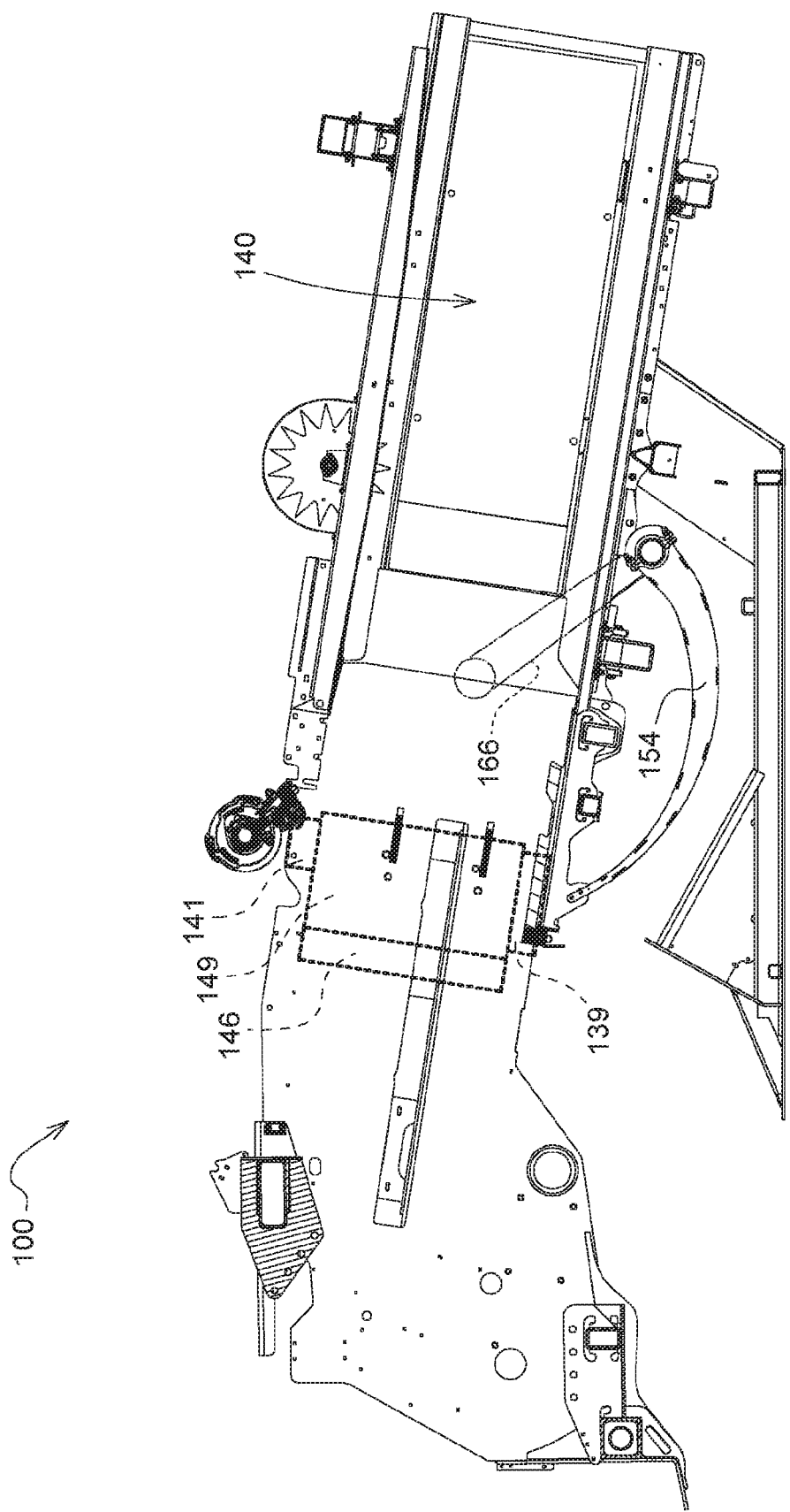
FIG. 4 is another side view of a portion of the agricultural harvesting machine of FIG. 1.
Figure 5:
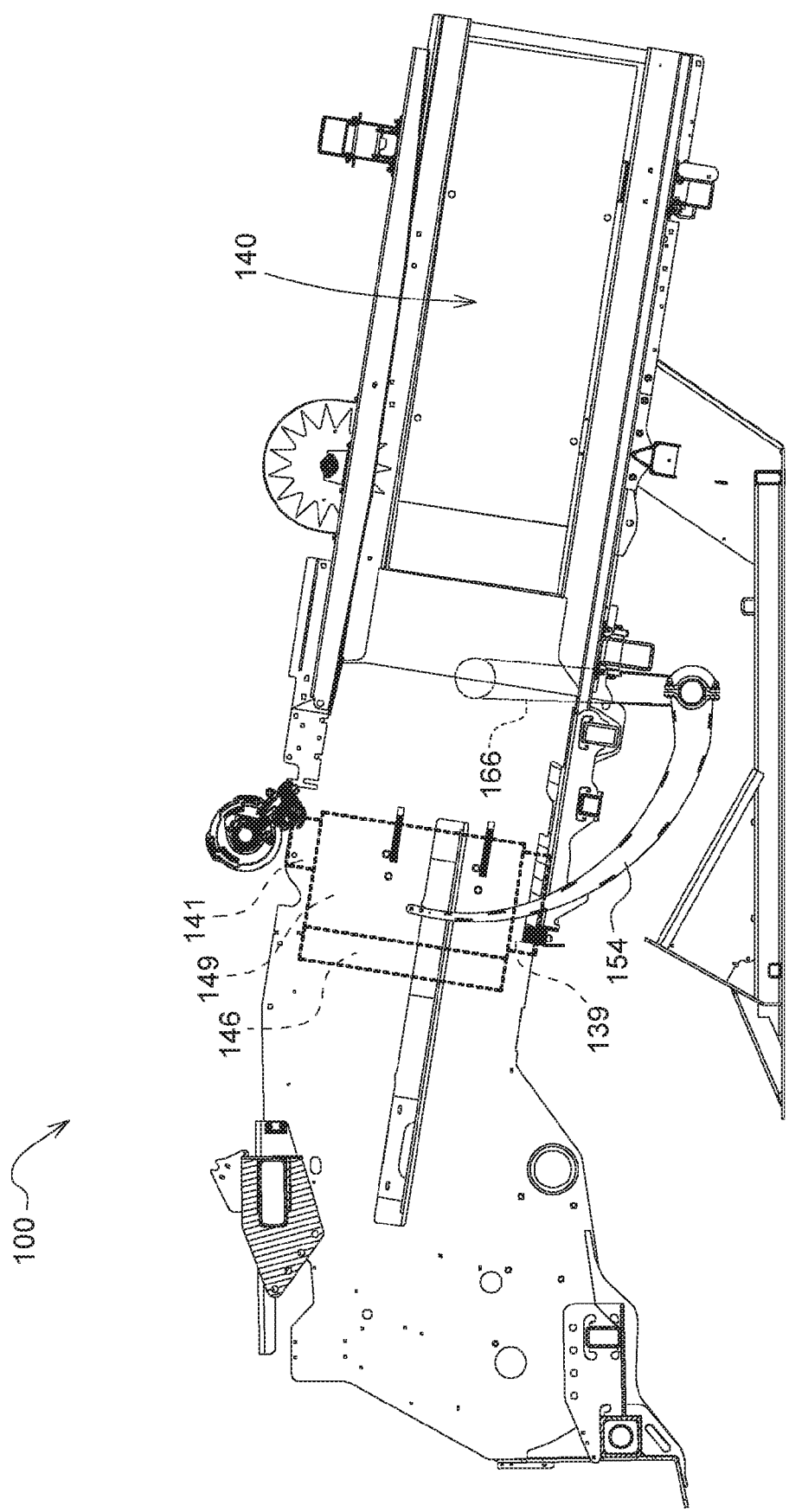
FIG. 5 is another side view of a portion of the agricultural harvesting machine of FIG. 1.
Figure 6:
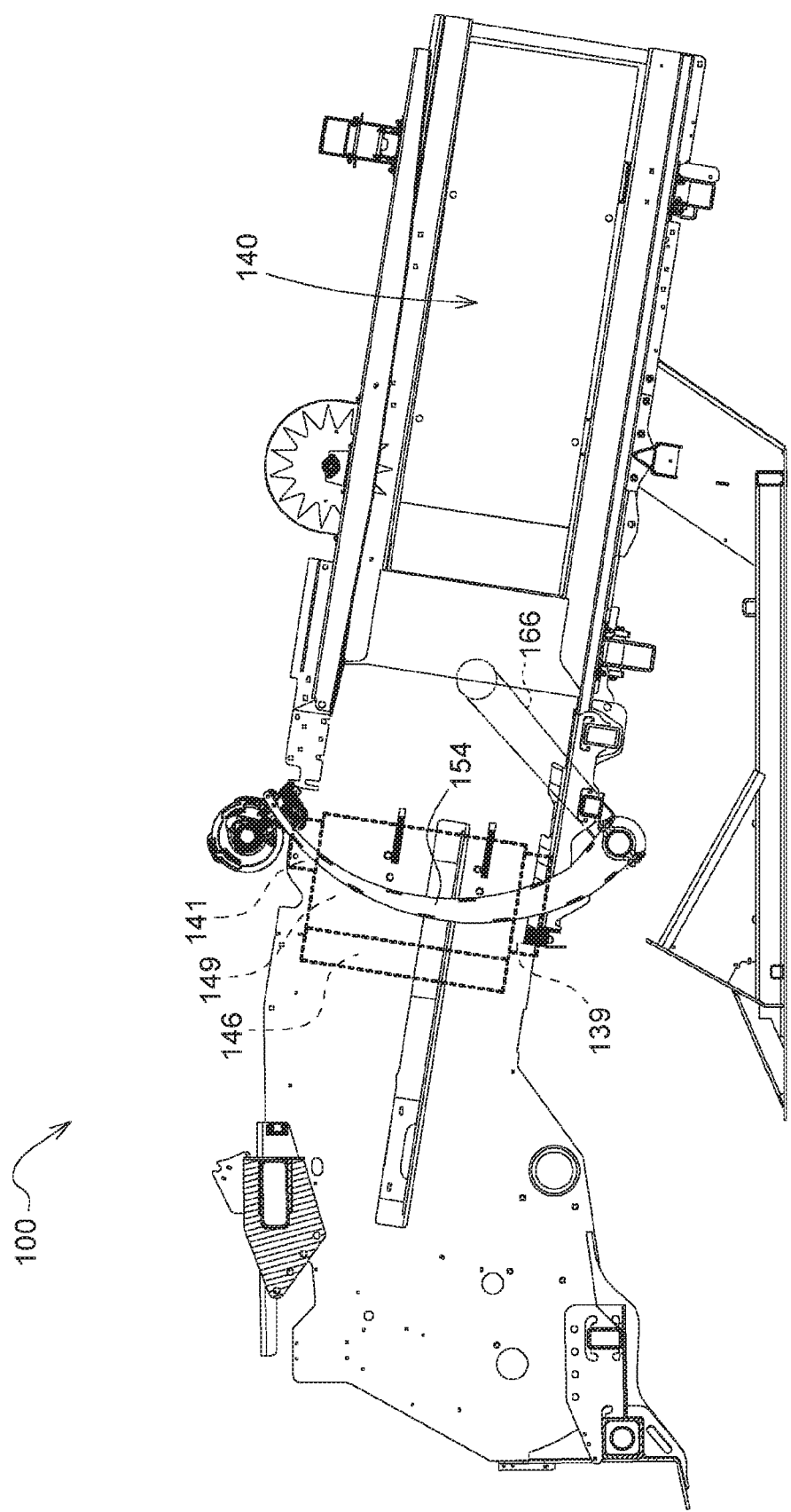
FIG. 6 is another side view of a portion of the agricultural harvesting machine of FIG. 1.

With reference to FIGS. 4-6, the delivery device 154 wraps binding material around at least a portion of the compressed crop or crop package and provides the binding material to the binding mechanism 152. The delivery device 154 remains in the lowered position as the crop material in the compression chamber 140 accumulates to pre-determined quantity, size, or amount. The binding system 150 activates and the delivery device 154 moves from the lowered position up through a slot 139 in the bottom of the compression chamber 140. The delivery device 154 continues to move upward through the compression chamber 140 in front of the crop material in the compression chamber 140. The delivery device 154 moves through a slot 149 located in a compression surface 147 of the plunger 146, which can be in contact with the crop material in the compression chamber 140. The delivery device 154 continues to move upward through the compression chamber 140 and through the slot 141 in the top of the compression chamber 140 to the binding mechanism 152. The delivery device 154 delivers the binding material to the binding mechanisms 152, which secures the binding material around the compressed crop material within the compression chamber 140. The delivery device 154 then begins moving downward out of the slot 141 in the top of the compression chamber 140 and back through the compression chamber 140. The delivery device 154 moves downward out of slot 139 in the bottom of the compression chamber 140 and back to the lowered position.

Figure 7:
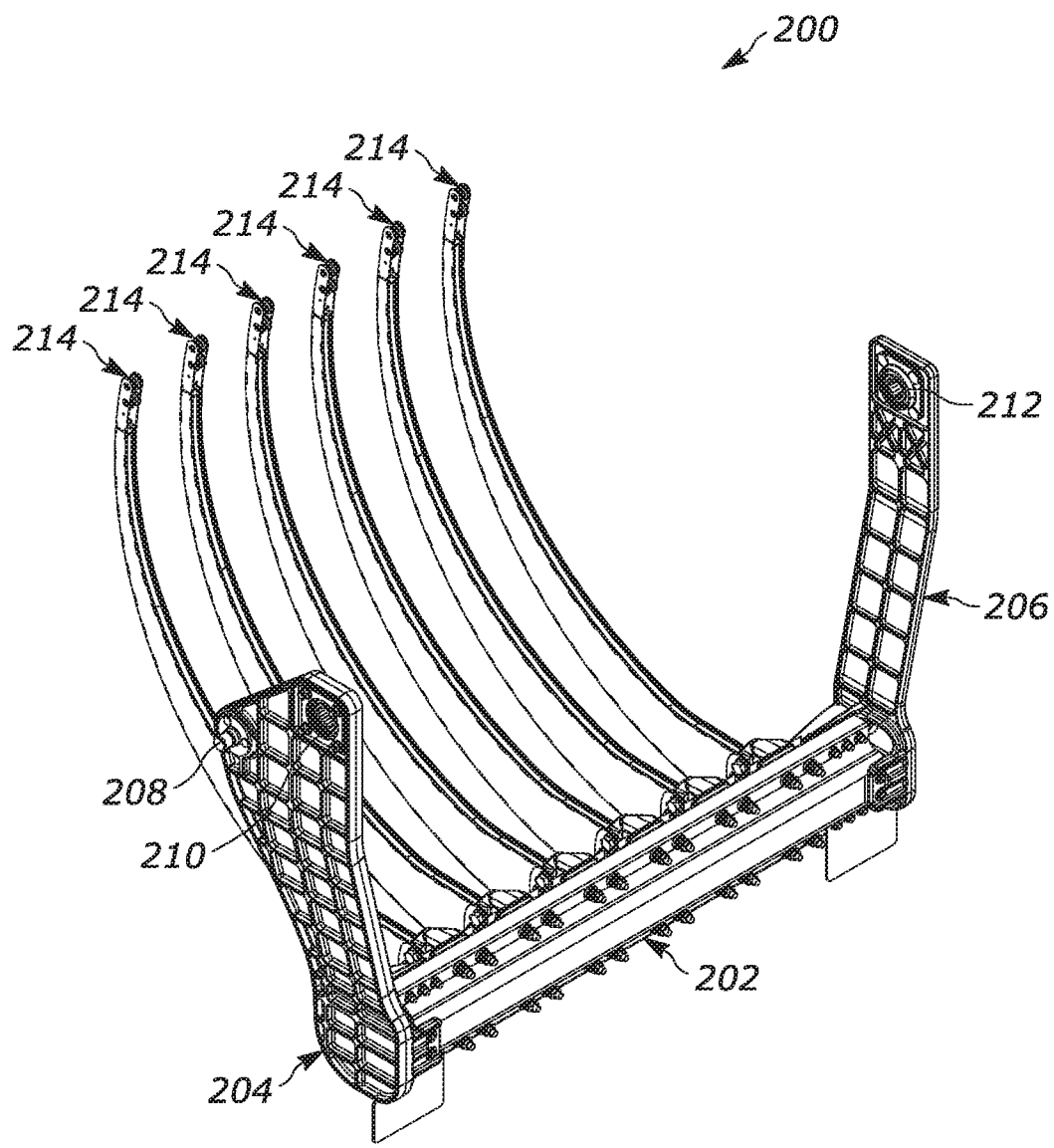
FIG. 7 is a perspective view of a needle frame assembly and a set of needles.

FIG. 7 shows an example of a needle frame assembly 200 according to an exemplary embodiment of the invention. The needle frame assembly 200 includes a yoke 202 and a pair of yoke arms 204, 206 connected to and extending from the yoke 202. In some embodiments, only a single yoke arm is used. The first yoke arm 204 includes a shaft 208 extending outwardly away from the arm and a first bearing mount 210. The shaft 208 connects to the lift link 168 and the bearing mount 210 pivotally connects to the support member 164. The second lift arm 206 includes a second bearing mount 212. A plurality of needles 214 are connected to the yoke 202. The yoke arms 204, 206 are shown as connected with fasteners, but can also be connected through a joining method (e.g., adhesive bonding, welding, etc.).

Figure 8:
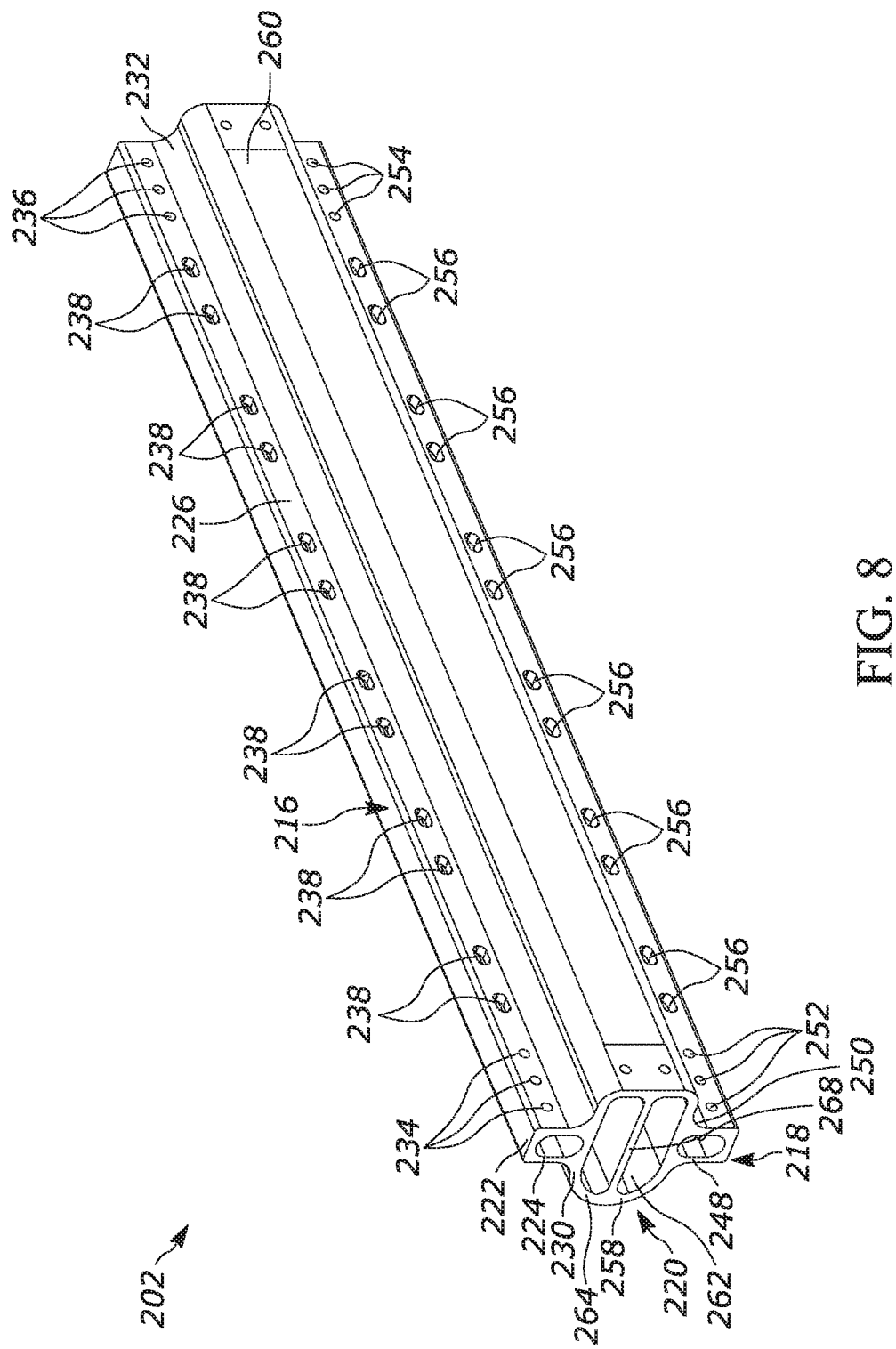
FIG. 8 is a perspective view of the yoke of the needle frame assembly of FIG. 7.
Figure 9:
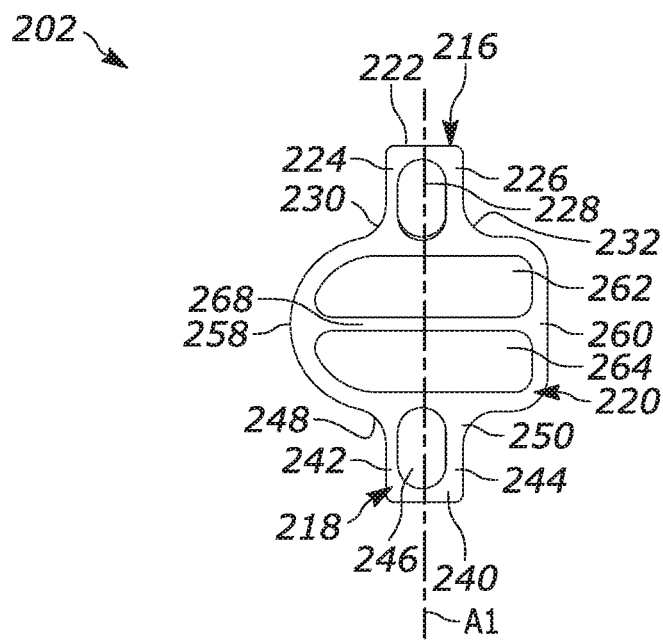
FIG. 9 is a side view of the yoke of FIG. 8.
Figure 10:
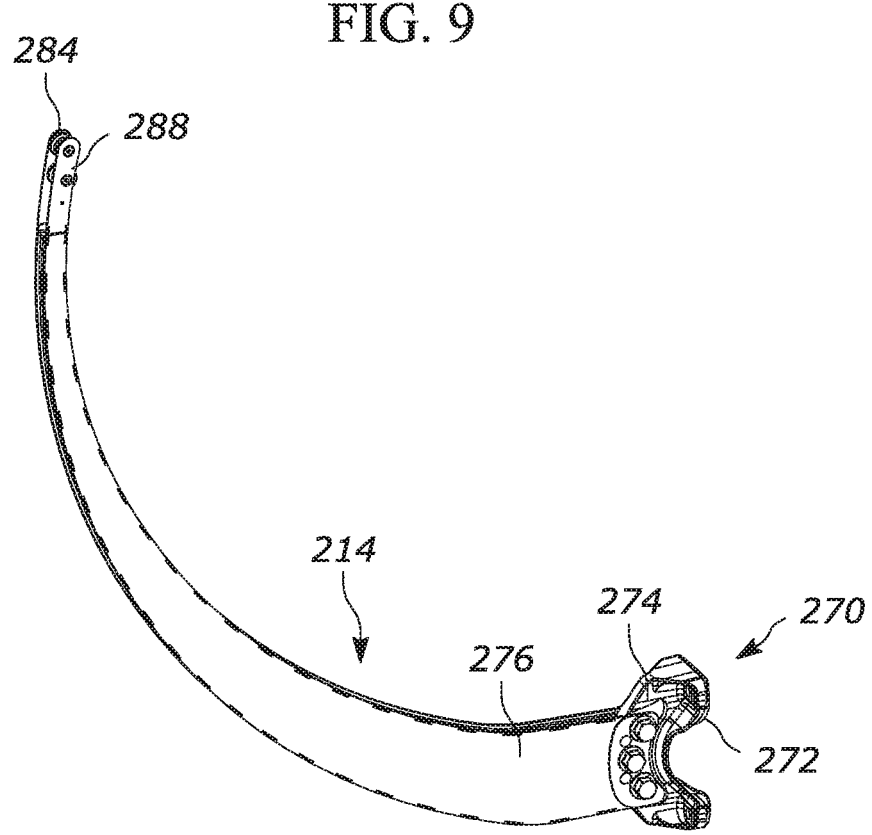
FIG. 10 is a perspective view of a needle and needle joint of FIG. 7.
Figure 11:
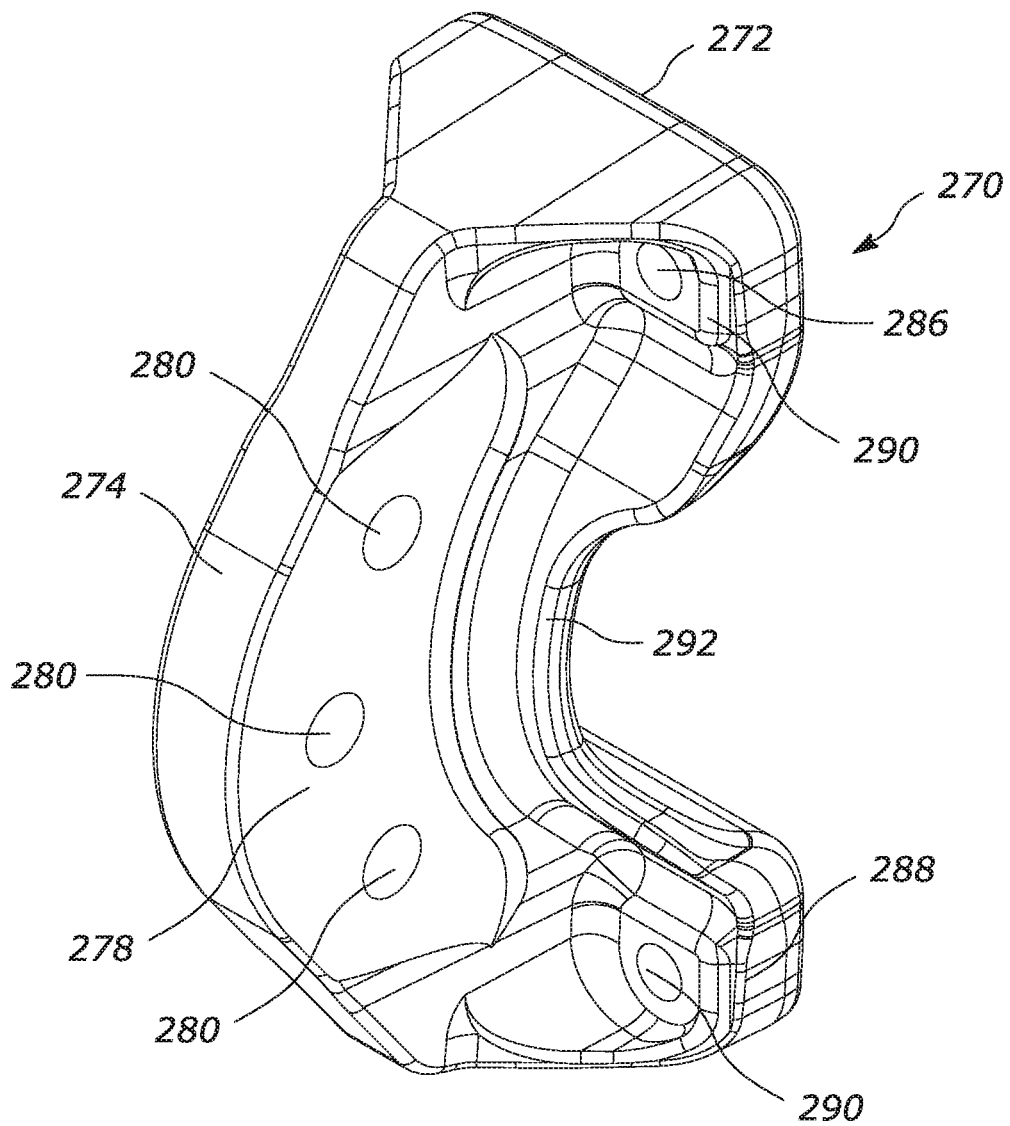
FIG. 11 is a perspective view of the needle joint of FIG. 10.
Figure 12:
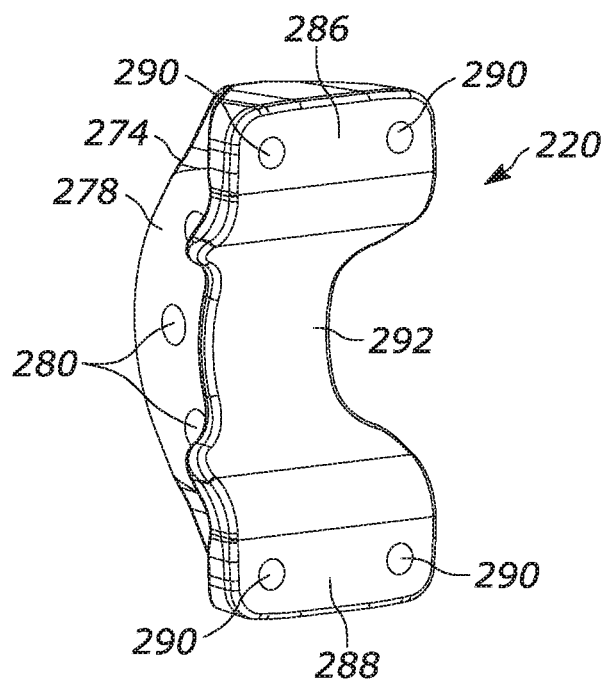
FIG. 12 is a rear perspective view of the needle joint of FIG. 11.
Figure 13:
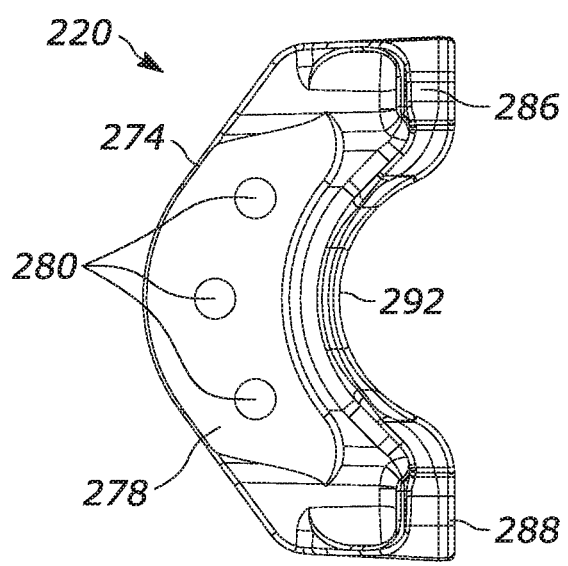
FIG. 13 is a side view of the needle joint of FIG. 11.

As best shown in FIGS. 8 and 9, the yoke has an upper bar 216, a lower bar 218, and a central section 220 positioned between the upper bar 216 and the lower bar 218. The upper bar 216 can have a substantially rectangular outer configuration with a substantially rectilinear upper portion 222, a substantially rectilinear first outer portion 224, and a substantially rectilinear second outer portion 226. A first longitudinal chamber 228 extends through the upper bar 216. The first chamber 228 can have a substantially obround configuration. A curved first transition 230 connects the first outer portion 224 with the central section 220 and a curved second transition 232 connects the second outer portion 226 with the central section 220. One or more transverse openings can extend along the length of the upper bar 216. The transverse openings can include a first set of outer openings 234, a second set of outer openings 236, and a first set of central openings 238. The first and second outer openings 234, 236 receive fasteners to connect the arms 204, 206 to the yoke 202. The first central openings 238 receive fasteners to connect the needles 214 to the yoke 202.

Similar to the upper bar 216, the lower bar 218 can have a substantially rectangular outer configuration with a substantially rectilinear lower portion 240, a substantially rectilinear third outer portion 242, and a substantially rectilinear fourth outer portion 244. A second longitudinal chamber 246 extends through the lower bar 218. The second longitudinal chamber 246 can have a substantially obround configuration. A curved third transition 248 connects the third outer portion 242 with the central section 220 and a curved fourth transition 250 connects the fourth outer portion 244 with the central section 220. One or more transverse openings can extend along the length of the lower bar 218. The transverse openings can include a third set of outer openings 252, a fourth set of outer openings 254, and a second set of central openings 256. The third and fourth outer openings 252, 245 receive fasteners to connect the arms 204, 206 to the yoke 202. The second central openings 256 receive fasteners to connect the needles 214 to the yoke 202.

The central section 220 can have a substantially D-shaped configuration with a curvilinear front portion 258 facing the needles and a substantially rectilinear rear 260 portion opposite the front portion. The front portion 206 can blend into the first and third transitions 230, 248 and the rear portion 260 can blend into the second and fourth transitions 232, 250. A third longitudinal chamber 262 and fourth longitudinal chamber 264 extend through the central portion 220. The third and fourth chamber 262, 264 can be separated by a central beam 268. The third and fourth chamber 262, 264 can have a substantially bullnose configuration.

In certain embodiments, the size, shape, and configuration of the components of the yoke 202 discussed above can be varied from the illustrated embodiments.

FIGS. 10-13 show an exemplary needle joint 270 that connects to the yoke 202. The needle joint 270 includes a base 272 and a needle seat 274 that extends outwardly from the base 272. The base 272 connects to the yoke 202 and a shaft 276 of a needle 214 is connected to the needle seat 274. The opposite sides of the needle seat 274 can include a recessed portion 278 that receives the needle shaft 276. A set of openings 280 extend through the seat 276 to receive fasteners, for example bolts, that connect the needle 214 to the needle joint 270. The shaft 276 of the needle 214 extends to a needle tip 282, which can include one or more rollers 284.

The base 272 includes a set of footings, for example an upper footing 286 and a lower footing 288. The upper footing 286 engages the upper bar 216 of the yoke 202 and the lower footing 288 engages the lower bar 218. Each footing 286,288 includes a pair of openings 290 that align with one of the central openings 238, 256. The base 272 can include a curved inner portion 292 between the upper footings 286 and the lower footings 288 that is configured to receive the front portion 258 of the yoke 202.

Figure 14:
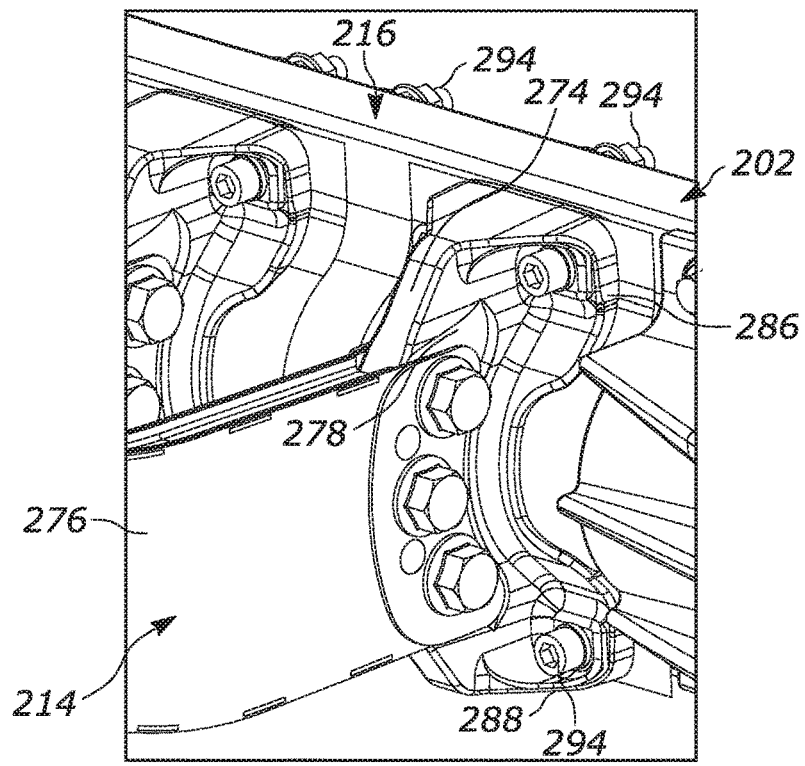
FIG. 14 is a partial view of the connection of the needle joint and the yoke.
Figure 15:
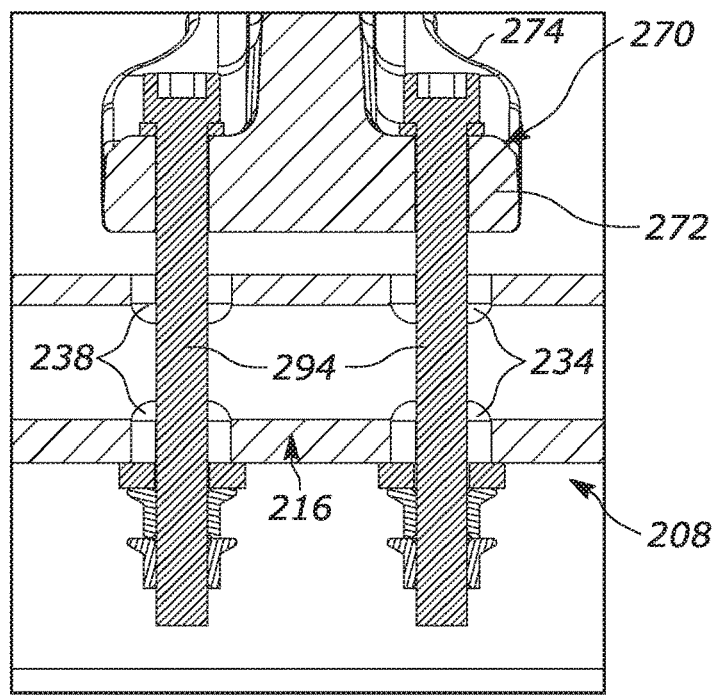
FIG. 15 is a top, sectional view of the connection of FIG. 14.

As shown in FIGS. 14 and 15, base fasteners 294 (e.g., bolts) extend through the footings 286, 288 and into the central openings 238, 256 on the yoke 202 to connect the needle joint 270 to the yoke 202. In order to adjust the position of the needle tip 282, the base fasteners 294 can be tightened or loosened to raise or lower the position of the needle tip 282 with respect to the yoke 202. For example loosening the lower base fasteners 294 and tightening the upper base fasteners 294 will cause rotation of the needle joint 270 on the yoke 202 to raise the needle tip 282. In some embodiments, the structure of the footings 286, 288 can be modified from what is shown to provide a captured feature for the fasteners 294. For example, recessed openings can be made which surround and capture the head of the bolts (e.g., cylindrical, hex, star, etc.) to prevent the bolts from rotating as a nut is tightened.

The yoke 202 should exhibit sufficient strength, stiffness, and/or rigidity through the operating cycle so that the needles 214 maintain their relative position within the slots 139, 149, 141. Additionally, because of the rapid movement of the delivery device 154 during each cycle, the mass of the yoke 202 should be minimized to reduce the momentum of the delivery device 154 during its cycle to reduce stress on the various components and reduce cycle time. While yokes are typically made from a steel member having a cylindrical or rectangular cross-section and welded components, such steel yokes are heavy, which increases the momentum during a cycle, thereby increasing the stress on the components of the delivery device 154, as well as slowing the cycle time. Other lighter materials, such as aluminum, do not exhibit the material properties required to form the yoke using the traditional cross-sectional shapes in the same general dimensions previously utilized by steel yokes, i.e. square or cylindrical. Because the yoke 202 includes an asymmetrical cross-section through a vertical central axis A1 with multiple internal chambers. The cross-sectional shape of the yoke 202 enables the yoke 202 to be manufactured from extruded aluminum, instead of steel, while maintaining the same generally exterior dimensions of traditional yokes. The yoke 202 described herein, when manufactured from aluminum and due to its unique cross-sectional shape, reduces weight while increasing the stiffness of the yoke 202 relative to traditional steel yokes, allowing for greater structural integrity with a reduced momentum during movement of the needle assembly 200.

Figure 16:
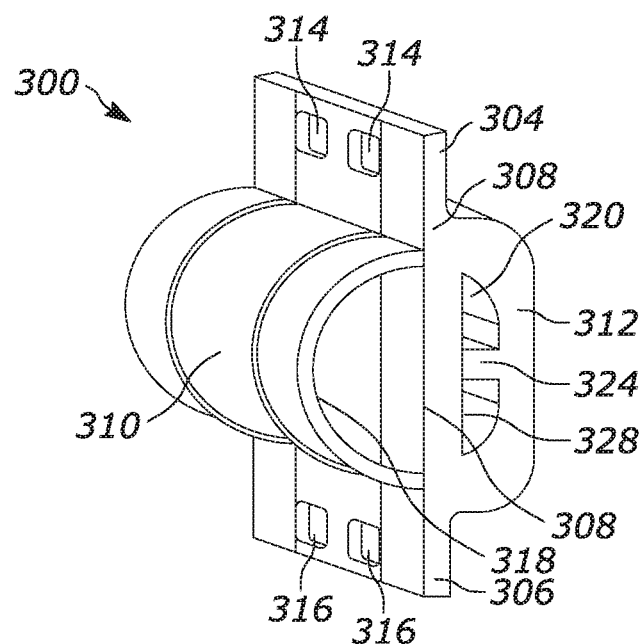
FIG. 16 is a perspective view of another exemplary yoke.

FIG. 16 shows another exemplary yoke 300 that includes a base 302 having an upper portion 304, a lower portion 306, and a central portion 308. A front portion 310 extends from a first side of the central portion 308 and a rear portion 312 extends from a second side of the central portion 308. Only a portion of the yoke is shown, as the yoke can extend to a desired distance. The yoke can be made from extruded aluminum.

The upper and lower portions 304, 306 have a rectangular configuration. A first set of transverse openings 314 extend through the upper portion 304 and a second set of transverse openings 316 extend through the lower portion 306. The first and second transverse openings 314, 316 receive fasteners to connect a needle to the yoke 300. The front portion 310 can have a substantially semi-cylindrical configuration which includes a curved edge partially defining a longitudinal opening 318. The rear portion 312 can have a substantially rectangular configuration with rounded outer corners. A second longitudinal opening 320 and a third longitudinal opening 322 can extend through the rear portion 312. The first and second openings 320, 322 are separated by a beam 324.

Figure 17:
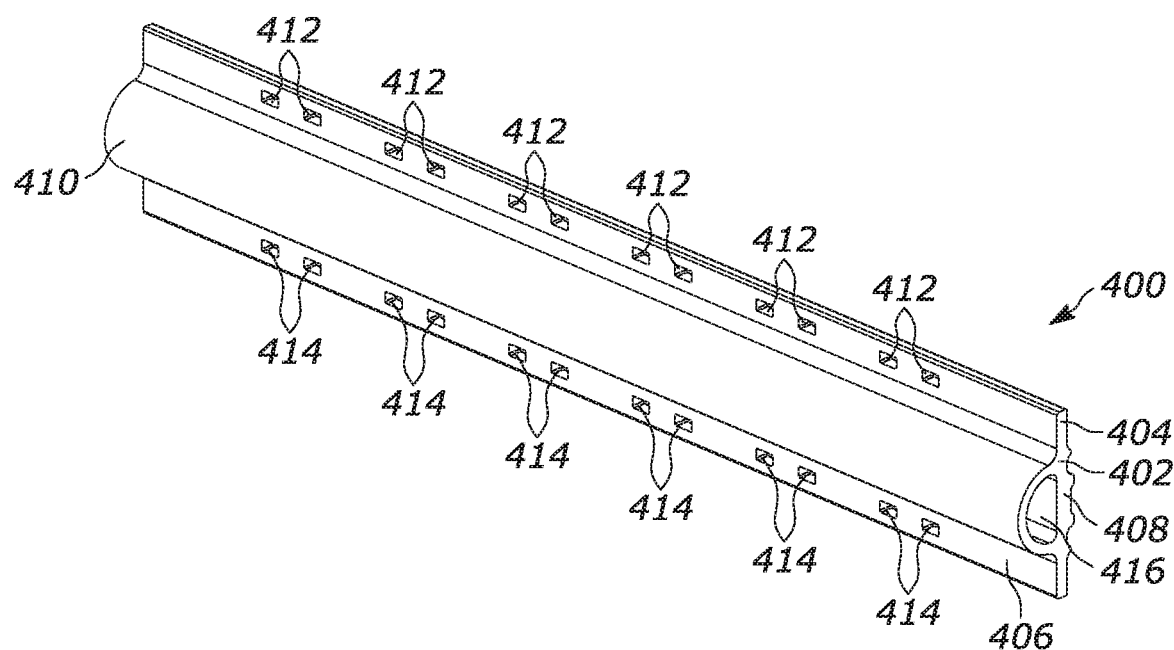
FIG. 17 is a perspective view of another exemplary yoke.

FIG. 17 shows another exemplary yoke 400 that includes a base 402 having an upper portion 404, a lower portion 406, and a central portion 408. A front portion 410 extends from a first side of the central portion 408. The upper and lower portions 404, 406 have a rectangular configuration. A first set of transverse openings 412 extend through the upper portion 404 and a second set of transverse openings 414 extend through the lower portion 406. The first and second openings 412, 414 receive fasteners to connect a needle to the yoke 400. The front portion 410 can have a substantially semi-cylindrical configuration which includes a curved edge partially defining a longitudinal opening 416. The yoke 400 can be made from extruded aluminum.

Figure 18:
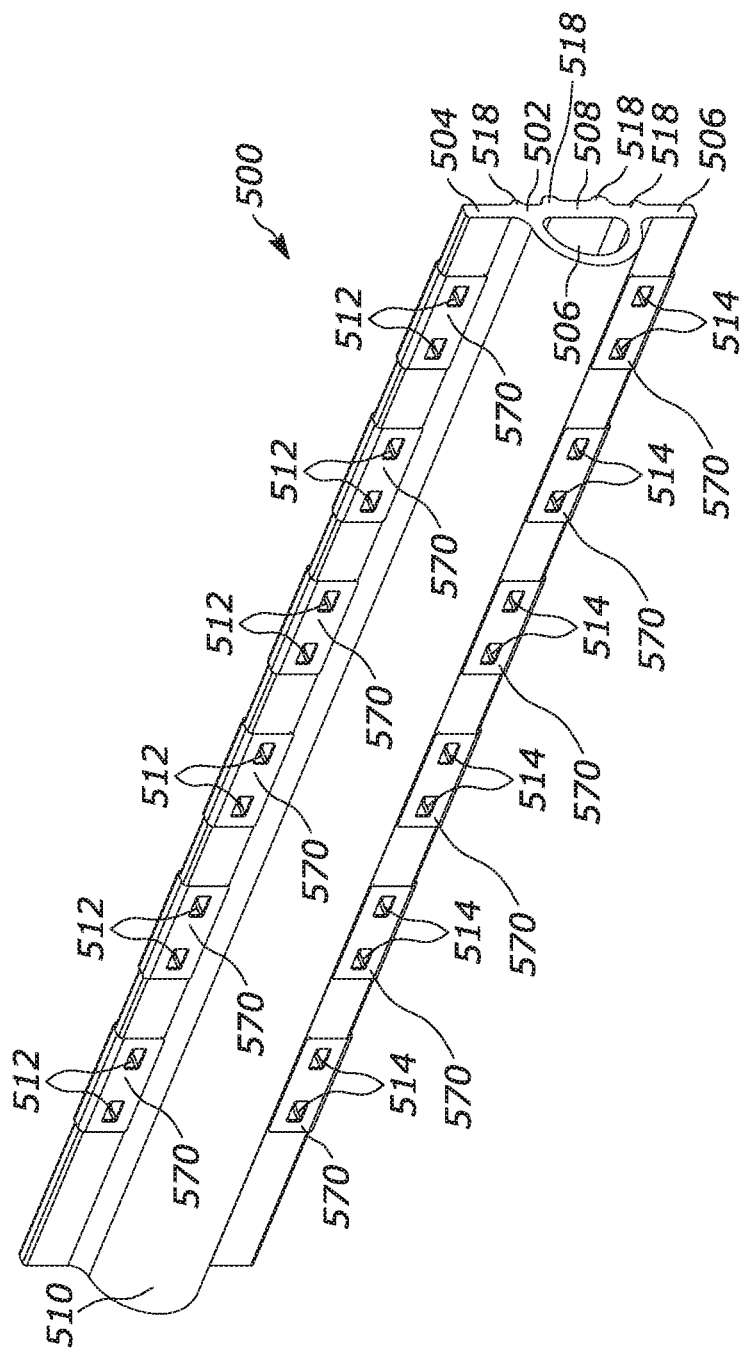
FIG. 18 is a perspective view of another exemplary yoke.
Figure 19:
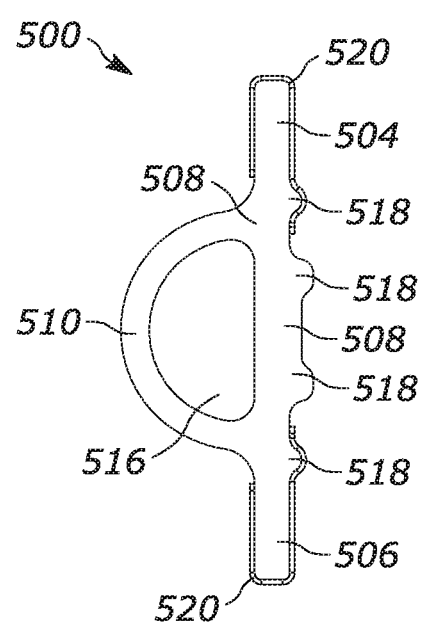
FIG. 19 is a side view of the yoke of FIG. 18.

FIGS. 18 and 19 show another exemplary yoke 500 that includes a base 502 having an upper portion 504, a lower portion 506, and a central portion 508. A front portion 510 extends from a first side of the central portion 508. The upper and lower portions 504, 506 have a rectangular configuration. A first set of transverse openings 512 extend through the upper portion 504 and a second set of transverse openings 514 extend through the lower portion 506. The first and second openings 512, 514 receive fasteners to connect a needle to the yoke 500. The front portion 510 can have a substantially semi-cylindrical configuration which includes a curved edge partially defining a longitudinal opening 516. A plurality of ribs 518 can extend from the rear of the base.

Inserts 520 can be connected to the upper and lower portions 504, 506 around the first and second openings 512, 514 to provide additional reinforcement. As shown in FIG. 19, the inserts 520 can each extend over the upper and lower portions 504, 506 and over one of the ribs 518. Placing the inserts 520 over the ribs 518 can help clip the inserts 518 to the respective upper and lower portions 50, 506. The inserts 520 can be made from a different material than the yoke 502. For example, the yoke 502 can be made from extruded aluminum and the inserts 520 can be made from steel.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An agricultural harvesting machine comprising:
 a binding mechanism configured to secure binding material around crop material formed into a crop package; and
 a delivery device configured to wrap binding material around a portion of the crop package and provide binding material to the binding mechanism,
 wherein the delivery device includes:
  a needle connected to a needle frame;
  wherein the needle frame includes a yoke extending along a central longitudinal axis, and a yoke arm extending from the yoke for connecting the yoke to a lift link;
  wherein the yoke includes a central section, an upper bar extending from the central section, and a lower bar extending from the central section; and
  wherein the central section has an asymmetrical cross-sectional shape through a reference plane defined by a first axis and a second axis both disposed orthogonal to the central longitudinal axis of the yoke.

2. The agricultural harvesting machine of claim 1, wherein the central section has a substantially D-shaped configuration with a curvilinear front portion facing the needle and a rectilinear rear portion opposite the front portion.

3. The agricultural harvesting machine of claim 1, wherein the upper bar includes a transverse first central opening and the lower bar includes a transverse second central opening, and wherein the needle is connected to the yoke through a fastener extending through the first central opening and a fastener extending through the second central opening.

4. The agricultural harvesting machine of claim 1, wherein the upper bar includes longitudinal first chamber, the lower bar includes a longitudinal second chamber, and the central section includes a longitudinal third chamber separate from the first chamber and the second chamber.

5. The agricultural harvesting machine of claim 4, wherein the central section includes a longitudinal fourth chamber and a beam separating the third chamber and the fourth chamber.

6. The agricultural harvesting machine of claim 1, wherein the needle is connected to the needle frame by a needle joint, and wherein the needle joint includes a base having an upper footing engaging the upper bar, a lower footing engaging the lower bar, and a curved inner portion extending between the upper footing and the lower footing receiving the central section.

7. The agricultural harvesting machine of claim 1, wherein the upper bar and the lower bar are integrally formed with the central section as a monolithic structure from aluminum.

8. An agricultural harvesting machine comprising:
a binding mechanism configured to secure binding material around crop material formed into a crop package; and
a delivery device configured to wrap the binding material around a portion of the crop package and provide the binding material to the binding mechanism;
wherein the delivery device includes a needle connected to a needle frame, the needle frame includes a yoke extending between a first yoke arm and a second yoke arm, one of the yoke arms extending from the yoke for connecting the yoke to a lift link, the yoke including an upper bar having a longitudinal first chamber, a lower bar having a longitudinal second chamber, and a central section positioned between the upper bar and the lower bar and having a longitudinal third chamber separate from the first chamber and the second chamber.

9. The agricultural harvesting machine of claim 8, wherein the central section includes a longitudinal fourth chamber and a beam separating the third chamber and the fourth chamber.

10. The agricultural harvesting machine of claim 8, wherein the upper bar includes a transverse first central opening and the lower bar includes a transverse second central opening, and wherein the needle is connected to the yoke through a fastener extending through the first central opening and a fastener extending through the second central opening.

11. The agricultural harvesting machine of claim 8, wherein the central section has a substantially D-shaped configuration with a curvilinear front portion facing the needle and a rectilinear rear portion opposite the front portion.

12. The agricultural harvesting machine of claim 8, wherein the first and second chambers have a substantially obround configuration.

13. The agricultural harvesting machine of claim 8, wherein the third chamber has a substantially bullnose configuration.

14. An agricultural harvesting machine comprising:
a binding mechanism configured to secure binding material around crop material formed into a crop package; and
a delivery device configured to wrap the binding material around a portion of the crop package and provide binding material to the binding mechanism;
wherein the delivery device includes a needle connected to a needle frame, the needle frame includes a yoke extending between a first yoke arm and a second yoke arm, one of the yoke arms extending from the yoke for connecting the yoke to a lift link, the yoke having a substantially D-shaped configuration with a curvilinear front portion facing the needle and a rectilinear rear portion opposite the front portion.

15. The agricultural harvesting machine of claim 14, wherein the yoke includes an upper bar extending above the front portion and a lower bar extending below the front portion.

16. The agricultural harvesting machine of claim 14, wherein a longitudinal chamber extends through the yoke.

17. The agricultural harvesting machine of claim 15, wherein the needle is connected to the needle frame by a needle joint, and wherein the needle joint is rotatably received on the front portion of the yoke.

18. The agricultural harvesting machine of claim 17, wherein the needle joint includes a base having an upper footing engaging the upper bar, a lower footing engaging the lower bar, and a curved inner portion extending between the upper footing and the lower footing receiving the front portion of the yoke.

19. The agricultural harvesting machine of claim 17, wherein the needle joint includes a seat extending from the base and a shaft of the needle is connected to the seat.

20. The agricultural harvesting machine of claim 17, wherein the upper bar includes a transverse first central opening and the lower bar includes a transverse second central opening, and wherein the needle is connected to the yoke through a first fastener extending through the needle joint and the first central opening and a second fastener extending through the needle joint and the second central opening, and wherein adjustment of the first and second fastener causes rotation of the needle joint.

\* \* \* \* \*